(12) United States Patent
Guidotti et al.

(10) Patent No.: US 11,220,519 B2
(45) Date of Patent: Jan. 11, 2022

(54) COMPONENTS AND CATALYSTS FOR THE POLYMERIZATION OF OLEFINS

(71) Applicant: BASELL POLIOLEFINE ITALIA S.R.L., Milan (IT)

(72) Inventors: Simona Guidotti, Ferrara (IT); Dario Liguori, Ferrara (IT); Giampiero Morini, Ferrara (IT); Gianni Vitale, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 17/267,601

(22) PCT Filed: Jul. 25, 2019

(86) PCT No.: PCT/EP2019/070086
§ 371 (c)(1),
(2) Date: Feb. 10, 2021

(87) PCT Pub. No.: WO2020/035283
PCT Pub. Date: Feb. 20, 2020

(65) Prior Publication Data
US 2021/0309676 A1   Oct. 7, 2021

(30) Foreign Application Priority Data

Aug. 14, 2018 (EP) .................................... 18188840

(51) Int. Cl.
*C07F 7/28* (2006.01)
*C07F 3/02* (2006.01)
*C07F 9/94* (2006.01)
*C08F 210/06* (2006.01)

(52) U.S. Cl.
CPC .................. *C07F 7/28* (2013.01); *C07F 3/02* (2013.01); *C07F 9/94* (2013.01); *C08F 210/06* (2013.01)

(58) Field of Classification Search
None
See application file for complete search history.

(56) References Cited

U.S. PATENT DOCUMENTS

| 4,220,554 A | 9/1980 | Scata et al. |
| 5,007,357 A | 4/1991 | Takenoya et al. |

FOREIGN PATENT DOCUMENTS

| CN | 106170500 A | 11/2016 |
| CN | 107949588 A | 4/2018 |
| WO | 9844009 A1 | 10/1998 |
| WO | 2017042058 A1 | 3/2017 |

OTHER PUBLICATIONS

International Search Report and Written Opinion dated Sep. 11, 2019 (Sep. 11, 2019) for Corresponding PCT/EP2019/070086.

*Primary Examiner* — Clinton A Brooks

(57) ABSTRACT

A solid catalyst component for the polymerization of olefins $CH_2=CHR$ in which R is hydrogen or a hydrocarbon radical with 1-12 carbon atoms, made from or containing Mg, Ti, Bi, halogen and an electron donor obtained from a process including the steps:

(a) dissolving a $Mg(OR)_2$ compound wherein R groups, equal to or different from each other, are $C_1$-$C_{15}$ hydrocarbon groups optionally containing a heteroatom selected from O, N and halogen, in an organic liquid medium, thereby forming a first liquid mixture;

(b) contacting the first liquid mixture (a) with $TiCl_4$, thereby forming a second liquid mixture absent a solid phase, and (c) subjecting the second liquid mixture (b) to conditions, whereby solid catalyst particles are formed, wherein (i) a Bi compound and (ii) a bidentate electron donor compound are present in one or more of steps (a) to (c) and/or contacted with the solid catalyst particles obtained from (c).

15 Claims, No Drawings

COMPONENTS AND CATALYSTS FOR THE POLYMERIZATION OF OLEFINS

This application is the U.S. National Phase of PCT International Application PCT/EP2019/070086, filed Jul. 25, 2019, claiming benefit of priority to European Patent Application No. 18188840.5, filed Aug. 14, 2018, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a catalyst component for the polymerization of olefins, to the catalyst obtained therefrom and to the use of the catalysts in the polymerization of olefins $CH_2=CHR$ wherein R is hydrogen or a hydrocarbyl radical with 1-12 carbon atoms.

BACKGROUND OF THE INVENTION

In some instances, Ziegler-Natta (ZN) catalysts for the polymerization of polyolefins are made from or contain at least a catalyst component formed from a transition metal compound of Group 4 to 6 of the Periodic Table (IUPAC, Nomenclature of Inorganic Chemistry, 1989), a metal compound of Group 1 to 3 of the Periodic Table (IUPAC), and, optionally, a compound of group 13 of the Periodic Table (IUPAC) and/or an internal donor compound. In some instances, ZN catalysts are further made from or containing catalyst component(s), such as a cocatalyst and/or an external donor.

There are a variety of methods for preparing ZN catalyst. In one such method, the transition metal compound is contacted with a carrier material which is based on a magnesium compound, such as $MgCl_2$. The carrier material is formed in various ways.

In some instances, the morphology of the carrier, which is generated before the contact with the transition metal, is one of the defining factors for the morphology of the final catalyst. In further instances, the distribution of the catalytically active compounds on the support material is dependent on the support particle structure, like compactness of the support particles, porosity and pore size distribution, and leads to non-uniform distribution of the active component(s) within the catalyst particle.

In some instances, ZN catalysts are prepared by techniques wherein a solution made from or containing both Mg and Ti, and optionally an internal donor compound, is subjected to a controlled process producing solidified catalyst particles already containing the transition metal compound.

In some instances, the solid particles are additionally treated with a transition metal halide, optionally in the presence of an internal donor.

SUMMARY OF THE INVENTION

In a general embodiment, the present disclosure provides a solid catalyst component for the polymerization or copolymerization of olefins $CH_2=CHR$ wherein R is hydrogen or a hydrocarbon radical with 1-12 carbon atoms made from or containing titanium, bismuth, magnesium, halogen, and an electron donor compound obtained by a process including the following steps:

(a) dissolving a $Mg(OR)_2$ compound wherein R groups, equal to or different from each other, are $C_1$-$C_{15}$ hydrocarbon groups optionally containing a heteroatom selected from O, N and halogen, in an organic liquid medium, thereby forming a first liquid mixture;
(b) contacting the first liquid mixture of step (a) with $TiCl_4$, thereby forming a second liquid mixture absent a solid phase, and
(c) subjecting the second liquid mixture of step (b) to conditions, whereby solid catalyst particles are formed, wherein (i) a Bi compound and (ii) a bidentate electron donor compound are present in one or more of steps (a) to (c) and/or contacted with the solid catalyst particles obtained from step (c).

In some embodiments, the $Mg(OR)_2$ compound is a magnesium alkoxide wherein R is a $C_1$-$C_{15}$ alkyl group or has the structure of an ether group —ROR wherein R is a $C_1$-$C_{15}$ alkyl group.

In some embodiments, the Mg alkoxides are selected from the group consisting of Mg dimethoxides, diethoxides, di propoxides, di-butoxides, dipentoxides diethylhexyloxides, dioctyloxides. In some embodiments, the Mg alkoxides are mixed alkoxides selected from the group consisting of Mg ethoxide-butoxide, Mg butoxide-octyloxide, and Mg ethoxide-ethylhexyloxide.

In some embodiments, the Mg alkoxides are commercially available. In some embodiments, the Mg alkoxides are prepared in situ by reacting Mg dialkyl compounds with an alcohol or a hydroxy ether.

In some embodiments, the magnesium alkyls are selected from the group consisting of ethylbutyl magnesium, dibutyl magnesium, dipropyl magnesium, propylbutyl magnesium, dipentyl magnesium, butylpentylmagnesium, butyloctyl magnesium and dioctyl magnesium. In some embodiments, the alkyls are mixed dialkyl compounds wherein the first alkyl is a butyl group and the second alkyl is an ethyl or octyl group. In some embodiments, the dialkyl magnesium compound is selected from the group consisting of butyl octyl magnesium and ethyl butyl magnesium.

In some embodiments, the alcohols are selected from the group consisting of ethanol, propanol, butanol, hexanol, 2-ethyl-1-butanol, 4-methyl-2-pentanol, 1-heptanol, 2-heptanol, 4-heptanol, 2,4-dimethyl-3-pentanol, 1-octanol, 2-octanol, 2-ethyl-1-hexanol, 1-nonanol, 5-nonanol, diisobutyl carbinol, 1-decanol and 2,7-dimethyl-2-octanol. In some embodiments, the monohydric alcohol is 2-ethyl-1-hexanol.

In some embodiments, the hydroxy ethers are glycol monoethers. In some embodiments, the glycol monoethers are $C_2$-$C_4$ glycol monoethers. In some embodiments, the glycol monoethers are ethylene or propylene glycol monoethers wherein the ether moieties have from 2 to 15 carbon atoms, alternatively from 2 to 12 carbon atoms, alternatively 2 to 8 carbon atoms. In some embodiments, the monoethers are $C_2$ to $C_4$ glycol monoethers and derivatives thereof. In some embodiments, the $C_2$ to $C_4$ glycol monoethers are selected from the group consisting of ethylene glycol butyl ether, ethylene glycol hexyl ether, ethylene glycol 2-ethylhexyl ether, propylene glycol n-butyl ether, propylene glycol methyl ether, propylene glycol ethyl ether, propylene glycol n-hexyl ether, and propylene glycol 2-ethylhexyl ether. In some embodiments, the $C_2$ to $C_4$ glycol monoethers are selected from the group consisting of ethylene glycol hexyl ether, 1,3-propylene glycol ethyl ether and 1,3-propylene glycol n-butyl ether. In some embodiments, the hydroxy ethers are selected from the group consisting of 1,3-propylene glycol ethyl ether and 1,3-propylene glycol n-butyl ether.

In some embodiments, the organic liquid medium is a hydrocarbon diluent or a halohydrocarbon. In some embodiments, the hydrocarbon diluent is selected from the group consisting of isopentane, isooctane, cyclohexane and toluene. In some embodiments, the halohydrocarbon diluent is selected from the group consisting of methylene chloride and chlorobenzene. In some embodiments, the hydrocarbon diluent is selected from the group consisting of isooctane and toluene. In some embodiments, the halohydrocarbon diluent is chlorobenzene.

In step (b), the Mg alkoxide is contacted with $TiCl_4$ under conditions, thereby generating a second liquid mixture absent a solid phase. In some embodiments, the second liquid mixture has one or more liquid phases.

In some embodiments, because $TiCl_4$ is reactive towards Mg alkoxides, the reaction is carried out in the presence of reactants and conditions to prevent the formation of a precipitate.

In some embodiments, a second liquid mixture (b) is prepared by reacting the Mg alkoxide with $TiCl_4$, a titanium alkoxide, a phenolic compound and an alkanol in an inert liquid diluent that is the same as, or different from, the organic liquid medium used in step (a).

In some embodiments, the alkoxy groups of the Mg alkoxide, alkanol and those of the Ti alkoxides, independently have up to 4 carbon atoms inclusive. In some embodiments, the alkoxide moieties are selected from the group consisting of methoxide, propoxide, isopropoxide and butoxide. In some embodiments, the alkoxide moieties are ethoxide.

In some embodiments, the phenolic compound used in step (b) is selected from phenol or activating group-substituted phenol. As used herein, the term "activating group" refers to an aromatic ring carbon atom substituent free from active hydrogens which is ortho-para directing for aromatic ring substitution. In some embodiments, the ortho-para directing is electron donating. In some embodiments, the groups are selected from the group consisting of alkyl of up to 5 carbon atoms inclusive, alkoxy of up to 5 carbon atoms, halo, and dialkylamino wherein each alkyl independently has up to 5 carbon atoms inclusive. In some embodiments, the alkyl groups are selected from the group consisting of methyl, ethyl, isopropyl and n-butyl. In some embodiments, the alkoxy groups are selected from the group consisting of methoxy, ethoxy and i-propoxy. In some embodiments, the halo is chloro or bromo. In some embodiments, the dialkylamino are selected from the group consisting of dimethylamino, diethylamino and methylpropylamino. In some embodiments, the phenolic compounds for producing procatalyst precursor are selected from the group consisting of phenol, o-cresol, p-cresol, 3-methoxyphenol, 4-dimethylaminophenol, 2,6-di-tert-butyl-4-methylphenol and p-chlorophenol. In some embodiments, the phenolic compounds are alkyl-substituted phenol. In some embodiments, the phenolic compounds are o-cresol.

In some embodiments, the reaction step (b) is exemplified by the following partial equation,

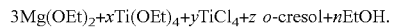

$$3Mg(OEt)_2 + xTi(OEt)_4 + yTiCl_4 + z\ o\text{-cresol} + nEtOH.$$

wherein y is more than about 0.1 but less than about 0.8, alternatively more than 0.3 but less than 0.5, (x+y) is more than about 0.2 but less than about 3, alternatively more than about 0.5 but less than about 2, z is more than about 0.05 but less than about 3, alternatively more than about 0.1 but less than about 2, and n is more than about 0.5 but less than about 9, alternatively more than about 2 but less than about 5.

In some embodiments, the initial interaction of the reactants in the reaction diluent takes place in a non-gaseous state at reaction temperatures from about 30° C. to 120° C., alternatively from 35° C. to 90° C.

In some embodiments, the initial heating, carried out under stirring, results in the formation of the second liquid mixture having only a liquid phase. In some embodiments, the second liquid mixture is a clear solution.

In some embodiments and in step (c), the second liquid mixture is heated to a higher temperature to remove alkanol. In some embodiments, the alkanol is ethanol. In some embodiments, the temperature of this second heating depends in part on the boiling point of a formed azeotrope containing alkanol. In some embodiments, the heating (azeotroping) temperatures are from about 70° C. to 120° C., alternatively from about 85° C. to about 110° C. The removal of the alkanol results in the formation of the form of solid, opaque, spheroidal particles.

The spheroidal particles are then contacted in a further step (d) with a bidentate electron donor. In some embodiments, the spheroidal particles are further contacted with a tetravalent titanium halide. In some embodiments, the contacting in step (d) occurs in the presence of a halohydrocarbon.

In some embodiments, the tetravalent titanium halide is a titanium tetrahalide. In some embodiments, the titanium tetrahalide is titanium tetrachloride or titanium tetrabromide. In some embodiments, the titanium tetrahalide is titanium tetrachloride.

In some embodiments, the halohydrocarbon is a halohydrocarbon of up to 12 carbon atoms inclusive, alternatively up to 9 carbon atoms inclusive, which contains at least one halogen atom and in the case of aliphatic halohydrocarbons contains at least two halogen atoms. In some embodiments, the aliphatic halohydrocarbons are selected from the group consisting of methylene chloride, methylene bromide, chloroform, carbon tetrachloride, 1,2-dibromoethane, 1,1,2-trichloroethane, trichlorocyclohexane, dichlorofluoromethane and tetrachlorooctane. In some embodiments, the aromatic halohydrocarbons are selected from the group consisting of chlorobenzene, bromobenzene, dichlorobenzene and chlorotoluene. In some embodiments, the aliphatic halohydrocarbons are selected from the group consisting of carbon tetrachloride and 1,1,2-trichloroethane. In some embodiments, the aromatic halohydrocarbon is chlorobenzene.

In some embodiments, the bidentate electron donors used as internal donors in the preparation of the solid catalyst component are selected from the group consisting of ethers, amines, silanes, carbamates, ketones, esters of aliphatic acids, alkyl and aryl esters of optionally substituted aromatic polycarboxylic acids, diol derivatives containing ester, carbamates, carbonates, amides groups or mixtures thereof.

In some embodiments, the internal donors are esters of phthalic acids. In some embodiments, the internal donors are esters of aliphatic acids selected from the group consisting of malonic, glutaric, maleic and succinic acids. In some embodiments, the esters are selected from the group consisting of n-butylphthalate, di-isobutylphthalate, and di-n-octylphthalate.

In some embodiments, the ethers are selected from the group of 1,3 diethers of the formula (I):

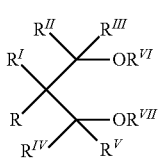

(I)

wherein R, $R^I$, $R^{II}$, $R^{III}$, $R^{IV}$ and $R^V$ are equal to or different from each other, and are hydrogen or hydrocarbon radicals having from 1 to 18 carbon atoms; and $R^{VI}$ and $R^{VII}$ are equal to or different from each other, and have the same meaning of R-$R^V$ except that $R^{VI}$ and $R^{VII}$ cannot be hydrogen. In some embodiments, one or more of the R-$R^{VII}$ groups are linked to form a cycle. In some embodiments, the 1,3-diethers have $R^{VI}$ and $R^{VII}$ selected from $C_1$-$C_4$ alkyl radicals.

In some embodiments, mixtures of donors are used. In some embodiments, the mixtures are made from or contain esters of succinic acids or glutaric acids and 1,3 diethers as described in Patent Cooperation Treaty Publication No. WO2011/061134. In some embodiments, the diesters are selected from diesters described in Patent Cooperation Treaty Publication WO2010/078494 and U.S. Pat. No. 7,388,061. In some embodiments, the diesters are selected from the group consisting of 2,4-pentanediol dibenzoate derivatives and 3-methyl-5-t-butyl catechol dibenzoates.

In some embodiments, the compounds are used in form of pure isomers or in the form of mixtures of enantiomers, or mixture of regioisomers and enantiomers.

In some embodiments, the amount of bidentate electron donor (ID) compound used in the catalyst preparation is such that the Mg/(ID) molar ratio ranges from 1 to 50 alternatively from 2 to 25. In some embodiments, the amount of electron donor compound in the final solid catalyst component ranges from 0.5 to 40 wt % by weight, alternatively from 1 to 35 wt %, with respect to the total weight of the solid catalyst component.

In some embodiments, the contact between the solid particles obtained in (c) and the electron donor occurs in the presence of a titanium tetrahalide and the halohydrocarbon.

In some embodiments, the tetravalent titanium halide is added to a mixture of the electron donor and solid particles coming from step (c). In some embodiments, the electron donor is mixed with the tetravalent titanium halide and halohydrocarbon and the resulting mixture is used to contact the solid particles.

In some embodiments, the solid product is washed at least once with the tetravalent titanium halide and the halohydrocarbon, taken together or employed separately. In some embodiments, an acid chloride is included in at least one wash, thereby further facilitating the replacement of at least a portion of the alkoxide moieties in the catalyst component with halide moieties. In some embodiments, the acid chloride is benzoyl chloride or phthaloyl chloride. In some embodiments, the solid catalyst component is washed with a light hydrocarbon, thereby removing soluble titanium compounds. In some embodiments, the light hydrocarbon is isooctane.

In some embodiments, the mixture of solid particles coming from step (c), tetravalent titanium halide, electron donor and halohydrocarbon is maintained at an elevated temperature. In some embodiments, the elevated temperature is a temperature of up to about 150° C. In some embodiments, the materials are contacted initially at or about ambient temperature and then heated. In some embodiments, tetravalent titanium halide is provided to convert at least a portion of the alkoxide moieties of the solid catalyst component to halide groups. This replacement is conducted in one or more contacting operations, each of which is conducted over a period of time ranging from a few minutes to a few hours. In some embodiments, a halohydrocarbon is present during each contacting. In some embodiments, an amount of electron donor is provided so that the molar ratio of electron donor to the magnesium present in the solid procatalyst is from about 0.01:1 to about 1:1, alternatively from about 0.05:1 to about 05:1. In some embodiments, the final washing with light hydrocarbon produces a final solid catalyst component having a granular morphology. In some embodiments, the procatalyst is used as obtained from the hydrocarbon washing without drying.

In some embodiments, the Bi compound does not have Bi-carbon bonds. In some embodiments, the Bi compounds are selected from the group consisting of Bi halides, Bi carbonate, Bi carboxylates, Bi acetate, Bi nitrate, Bi oxide, Bi sulphate, and Bi sulfide. In some embodiments, the Bi compounds have Bi with valence +3. In some embodiments, the Bi halides are selected from the group consisting of Bi trichloride and Bi tribromide. In some embodiments, the Bi compounds are selected from the group consisting of $BiCl_3$ and Bi decanoate. As used herein, the term "decanoate" includes linear decanoate or any of a decanoate's branched isomers.

In some embodiments, the amount of bismuth compound used in the process ranges from 0.005 to 0.2, alternatively from 0.010 to 0.1, alternatively from 0.01 to 0.04 mole per mole of Mg.

In some embodiments, the Bi compound is added in step (a) and dissolved together with magnesium alkoxide in the solvent system.

In some embodiments, the Bi compound is added in step (b). In some embodiments, the Bi compound is dissolved or suspended in the liquid medium.

In some embodiments, the Bi compound is added in step (d). In some embodiments, the Bi compound is dissolved or suspended in a liquid medium made from or containing the Ti halide compound.

In some embodiments, the Bi compound is introduced in more than one step (a)-(d), thereby further enhancing the Bi final amount. In some embodiments, the Bi compound is used in one of the steps (a)-(d).

In some embodiments and in step (b), the Mg alkoxide solution is mixed with $TiCl_4$ at a temperature of about −20° C. to about 30° C. and in the presence of a surfactant. In the successive step (c), precipitation of the solid catalyst components is obtained by slowly raising the temperature to at least 50° C., alternatively in the temperature range of 50 to 110° C., alternatively in the range of 70 to 100° C., alternatively in the range of 85 to 95° C., whereby the rate of temperature increase is in the range from 0.1° C. to 30° C. per minute, alternatively 0.5 to 10° C. per minute. In some embodiments, a surfactant is added to the Mg alkoxide solution before step (b).

In some embodiments, surfactants are polymer surfactants. In some embodiments, the polymer surfactants are selected from the group consisting of poly(alkyl methacrylate) and poly(alkyl acrylate), and the like. In some embodiments, a polyalkyl methacrylate is a polymer made from or containing one or more methacrylate monomers. In some embodiments, a polyalkyl methacrylate is a polymer made from or containing at least two different methacrylate monomers. In some embodiments, a polyalkyl methacrylate is a polymer made from or containing at least three different methacrylate monomers. In some embodiments, the acrylate and methacrylate polymers are made from or containing monomers other than acrylate and methacrylate monomers and the polymer surfactant contains at least about 40% by weight acrylate and methacrylate monomers.

In some embodiments, the surfactants are commercially available under the trade marks VISCOPLEX® from RohMax Additives, GmbH or CARBOPOL® and PEMULEN® from Noveon/Lubrizol. In some embodiments, the surfactants available under the trademarks VISCOPLEX® have product designations 1-254 or 1-256.

In some embodiments, a precipitating agent is added into the system. It is believed that the addition of a precipitating agent can influence morphology of the particles formed during the precipitation step.

In some embodiments, the bidentate electron donor is added to the Mg alkoxide solution prepared in step (a). In some embodiments, electron donor is introduced in form of a precursor, which is then transformed in situ to the electron donor by reaction with a corresponding Mg-alkoxide. In some embodiments, additional donors are added in any of steps (a) to (b).

In some embodiments, the reaction medium used as solvent in step (a) is also used in step (b). In some embodiments, the reaction is selected from liquid hydrocarbons. In some embodiments, the liquid hydrocarbons are aromatic or a mixture of aromatic and aliphatic hydrocarbons. In some embodiments, the aliphatic hydrocarbons have 5-20 carbon atoms, alternatively 5-16 carbon atoms, alternatively 5-12 carbon atoms, alternatively 5 to 9 carbon atoms. In some embodiments, the aromatic hydrocarbon is selected from substituted and unsubstituted benzenes, alternatively from alkylated benzenes, alternatively from toluene and xylenes. In some embodiments, the aromatic hydrocarbon is toluene.

It is believed that raising the temperature to above 50° C. (step c) causes solidification of catalyst particles. After precipitation, the solid catalyst particle undergoes washings. In some embodiments, the solid catalyst particle is washed at least once up to 6 times, alternatively at least twice, alternatively at least three times with a hydrocarbon. In some embodiments, the hydrocarbon is selected from aromatic and aliphatic hydrocarbons, alternatively toluene, heptane or pentane. In some embodiments, the hydrocarbon is toluene, alternatively hot toluene. In some embodiments, the hydrocarbon is a mixture of toluene and $TiCl_4$. As used herein, the term "hot toluene" refers to toluene having a temperature in the range of 80 to 100° C. In some embodiments, the amount of $TiCl_4$ varies from a few vol % to more than 50-vol %, alternatively from 5-vol % to 50-vol %, alternatively from 5 to 15-vol %. In some embodiments, at least one wash is done with 100-vol % $TiCl_4$. In some embodiments, one or several further washes after aromatic and/or $TiCl_4$ washes are run with aliphatic hydrocarbons of 4 to 8 carbon atoms. In some embodiments, these latter washings are performed with heptane and/or pentane. In some embodiments, washings are done with hot or cold hydrocarbons or combinations thereof. In some embodiments, "hot" refers to 90° C. In some embodiments, "cold" refers to room temperature. In some embodiments, the washings are with the same solvent. In some embodiments, the solvent is toluene. In some embodiments and during the catalyst component preparation, a reducing agent is added. It is believed that the reducing agent decreases the amount of titanium present in the solidified particles of the olefin polymerization catalyst component, being present in the oxidation state +4.

In some embodiments, reducing agents are selected from the group consisting of aluminum alkyl compounds, aluminum alkyl alkoxy compounds, and magnesium compounds. In some embodiments, aluminum compounds have a general formula $AlR_{3-n}X_n$, wherein R stands for a straight chain or branched alkyl or alkoxy group having 1 to 20, alternatively 1 to 10, alternatively 1 to 6 carbon atoms, X independently represents a residue selected from the group of halogen, and n stands for 0, 1 or 2. In some embodiments, the halogen is chloride. In some embodiments, at least one of the R residues is an alkyl group.

In some embodiments, the compound is added as an optional compound to the catalyst component synthesis. In some embodiments, the compound is added at any step (b) to (c), or during the washing step. In some embodiments, the reducing compound is added during the washing step, alternatively during the first washing step with hot toluene.

In some embodiments, the Bi compound does not have Bi-carbon bonds. In some embodiments, the Bi compounds are selected from the group consisting of Bi halides, Bi carbonate, Bi carboxylates, Bi acetate, Bi nitrate, Bi oxide, Bi sulphate, and Bi sulfide. In some embodiments, the Bi compounds have Bi with valence +3. In some embodiments, the Bi halides are selected from the group consisting of Bi trichloride and Bi tribromide. In some embodiments, the Bi compounds are selected from the group consisting of $BiCl_3$ and Bi decanoate. In some embodiments, the Bi compound is introduced in any of the steps (a)-(d).

In some embodiments, the Bi compound is added in step (b). In some embodiments, the Bi compound is dissolved or suspended in the liquid medium.

In some embodiments, the Mg alkoxide solution in a $C_6$-$C_{10}$ aromatic liquid reaction medium prepared in step (a), is first contacted with the electron donor or precursor thereof, thereby obtaining a further solution; in step (b), the solution obtained in step (a) is reacted with titanium tetrahalide at a temperature greater than 10° C. and less than 60° C., thereby producing an emulsion of a denser, $TiCl_4$/toluene-insoluble, oil dispersed phase having a Ti/Mg mol ratio 0.1 to 10 in an oil disperse phase having Ti/Mg mol ratio 10 to 100; agitating the emulsion, optionally in the presence of an emulsion stabilizer and or a turbulence minimizing agent, thereby maintaining the droplets of the dispersed phase within an average size range of 5 to 200 µm.

The disperse and dispersed phases are distinguishable from each another because the denser oil will not dissolve in a solution of titanium tetrachloride in toluene. In some embodiments, a solution for establishing this criterion has a toluene mol ratio of 0.1 to 0.3. The disperse and dispersed phases are also distinguishable because the great preponderance of the Mg provided (as complex) for the reaction with the Ti compound is present in the dispersed phase, as revealed by comparison of the respective Ti/Mg mol ratios.

Virtually the entirety of the reaction product of the Mg complex with the $TiCl_4$, which is the precursor of the final catalyst component, becomes the dispersed phase, and proceeds through the further processing steps to the final dry particulate form. In some embodiments, the disperse phase, still containing a useful quantity of Ti, is reprocessed for recovery of that metal.

It is believed that the production of a two-phase, rather than single-phase, reaction product is encouraged by carrying out the Mg complex/Ti metal compound reaction at low temperature, alternatively above 10° C. but below 60° C., alternatively between above 20° C. and below 50° C. It is believed that the two phases will tend to separate into a lower, denser oil phase and supernatant lighter phase. In some embodiments, the reaction product is maintained as an emulsion by agitation, alternatively in the presence of an emulsion stabilizer.

It is believed that the resulting particles from the dispersed phase of the emulsion are of a size, morphology (spherical shape) and uniformity which render the final catalyst component effective in olefin polymerization. In some embodiments, the morphology is preserved during the heating to solidify the particles and throughout the final washing and drying steps.

In some embodiments, an electron donor is an aromatic carboxylic acid ester, alternatively dioctyl phthalate. In some embodiments, the donor is formed in situ by reaction of an aromatic carboxylic acid chloride precursor with a $C_2$-$C_{16}$ alkanol and/or diol. In some embodiments, the liquid reaction medium is made from or contains toluene.

In some embodiments, emulsifying agents/emulsion stabilizers are used to facilitate the formation and/or stability of the emulsion. In some embodiments, surfactants are polymer surfactants. In some embodiments, the polymer surfactants are selected from the group consisting of poly(alkyl methacrylate) and poly(alkyl acrylate), and the like. In some embodiments, a polyalkyl methacrylate is a polymer made from or containing one or more methacrylate monomers. In some embodiments, a polyalkyl methacrylate is a polymer made from or containing at least two different methacrylate monomers. In some embodiments, a polyalkyl methacrylate is a polymer made from or containing at least three different methacrylate monomers. In some embodiments, the acrylate and methacrylate polymers are made from or containing monomers other than acrylate and methacrylate monomers and the polymer surfactant contains at least about 40% by weight acrylate and methacrylate monomers. In some embodiments, the surfactants are commercially available under the trade marks VISCOPLEX® from RohMax Additives, GmbH or CARBOPOL® and PEMULEN® from Noveon/Lubrizol. In some embodiments, the surfactants available under the trademarks VISCOPLEX® have product designations 1-254 or 1-256.

In some embodiments, a turbulence minimizing agent (TMA) is added to the reaction mixture. In some embodiments, the resulting catalyst component particles have a narrow size distribution.

It is believed that TMA serves for a grain size limitation by reducing the turbulences in the emulsion during agitation, thereby leading to a more uniform grain formation. It is alternatively believed that the mixing energy is better distributed into the emulsion. It is alternatively believed that TMA interacts with the surface of the grain, thereby limiting the size of the grain.

In some embodiments, the TMA is added to the reaction mixture when the emulsion is formed. The TMA is added to the reaction mixture before solidification of the droplets of the dispersed phase starts, thereby ensuring a uniform particle size distribution.

In some embodiments, the TMA agent is inert under the reaction conditions and soluble in the reaction mixture under the reaction conditions. In some embodiments, the TMA agent is selected from polymers without polar groups.

In some embodiments, TMA is selected from α-olefin polymers having a high molecular weight of MW about $1-40\times10^6$, or mixtures thereof. In some embodiments, TMA is selected from polymers of α-olefin monomers with 6 to 20 carbon atoms. In some embodiments, TMA is polydecene.

In some embodiments, the turbulence minimizing agent is selected from the group consisting of inert poly($C_6$-$C_{20}$)-olefins or mixtures thereof, alternatively from polyoctene, polynonene, polydecene, polyundecene, polydodecene and mixtures thereof, having the molecular weight and general backbone structure as previously defined. In some embodiments, the turbulence minimizing agent is added in a process step before particle formation starts, that is, in a step before solidification of the emulsion. In some embodiments, the turbulence minimizing agent is added to the emulsion in an amount of 1 to 1.000 ppm, alternatively 5 to 100 ppm, alternatively 5 to 50 ppm, based on the total weight of the reaction mixture.

In some embodiments, the Ti/Mg mol ratio of the denser oil is 1 to 5, alternatively 2 to 4. In some embodiments, the Ti/Mg mol ratio of the disperse phase oil is 55 to 65. In some embodiments, the ratio of the mol ratio Group 4 metal/Mg in the disperse phase oil to that in the denser oil is at least 10.

In some embodiments and in step (c), solidification of the dispersed phase droplets by heating is carried out at a temperature of 70-150° C., alternatively at 90-110° C.

In some embodiments, the catalyst component is in the form of particles having an average size range of 5 to 200 μm, alternatively 10 to 100, alternatively 20 to 50 μm.

In some embodiments, the content of Bi in the final catalyst ranges from 0.5 to 40%, alternatively from 0.5 to 35, alternatively from 0.5 to 20, alternatively from 1 to 20% wt. In some embodiments, the content of Bi ranges from 1 to 35, alternatively from 2 to 25% wt, alternatively from 2 to 20% wt. with respect to the total weight of catalyst.

In some embodiments, the amount of Mg ranges from 8 to 30%, alternatively from 10 to 25% wt, with respect to the total weight of solid catalyst component.

In some embodiments, the amount of Ti ranges from 0.5 to 5%, alternatively from 0.7 to 3% wt, with respect to the total weight of solid catalyst component.

In some embodiments, the catalyst component (A) is used as a solid or as a suspension.

In some embodiments, the solid catalyst components (A) are converted into catalysts for the polymerization of olefins by reaction with (B) organoaluminum compounds.

In some embodiments, the organoaluminum compounds are alkyl-Al compounds. In some embodiments, the alkyl-Al compounds are trialkyl aluminum compounds. In some embodiments, the trialkyl aluminum compounds are selected from the group consisting of triethylaluminum, triisobutylaluminum, tri-n-butylaluminum, tri-n-hexylaluminum, and tri-n-octylaluminum. In some embodiments, trialkylaluminums are used in mixtures with alkylaluminum halides, alkylaluminum hydrides or alkylaluminum sesquichlorides. In some embodiments, the alkylaluminum sesquichlorides are selected from the group consisting of $AlEt_2Cl$ and $Al_2Et_3Cl_3$. In some embodiments and in the catalyst system, the molar ratio of aluminum in component (B) to titanium in component (A) is from 5 to 1000, alternatively from 100 to 800. In some embodiments and in the catalyst system, the molar ratio of silicon in component (C) to titanium in component (A) is from 2 to 100, alternatively from 5 to 40.

In some embodiments, the polymers have a very high isotactic index and an external donor compound is used. In some embodiments, the external donor (C) is the same type or different from the electron donor compound used in the preparation of the solid catalyst component (A).

In some embodiments, the external donor compounds are selected from silicon compounds of formula $R_a^5R_b^6Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. In some embodiments, the silicon compounds have the values where a is 1, b is 1, c is 2, at least one of $R^5$ and $R^6$ is selected from branched alkyl, alkenyl, alkylene, cycloalkyl or aryl groups with 3-10 carbon atoms optionally containing heteroatoms and $R^7$ is a $C_1$-$C_{10}$ alkyl group. In some embodiments, $R^7$ is methyl. In some embodiments, the silicon compounds are selected from the group consisting of methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane, 1,1,1,trifluoropropyl-2-ethylpiperidinyl-dimethoxysilane and 1,1,1,trifluoropropyl-methyl-dimethoxysilane. In some embodiments, the silicon compounds have the values where a is 0, c is 3, $R^6$ is a branched alkyl or cycloalkyl group, optionally containing heteroatoms, and $R^7$ is methyl. In some embodiments, the silicon compounds are selected from the group consisting of cyclohexyltrimethoxysilane, t-butyltrimethoxysilane and thexyltrimethoxysilane.

In some embodiments, the electron donor compound (c) is used in such an amount to give a molar ratio between the organoaluminum compound and the electron donor compound (c) of from 0.1 to 500, alternatively from 1 to 300, alternatively from 3 to 100.

In some embodiments, these catalysts are used in the processes for the polymerization of olefins $CH_2$=CHR, wherein R is hydrogen or a hydrocarbyl radical with 1-12 carbon atoms. In some embodiments, the alpha-olefins for polymerization or copolymerization are selected from the group consisting of ethylene, propylene, butene-1,4-methyl-1-pentene and hexene-1. In some embodiments, the alpha-olefins for polymerization or copolymerization are selected from the group consisting of propylene and ethylene. In some embodiments, the catalysts reach activity over 140 Kg/gcat, alternatively ranging from 150 to 190 kg/gcat.

In some embodiments, the polymerization is carried out in slurry using as diluent an inert hydrocarbon solvent, or in bulk using the liquid monomer as a reaction medium. In some embodiments, the liquid monomer is propylene. In some embodiments, the polymerization process is carried out in gas-phase operating in one or more fluidized or mechanically agitated bed reactors.

In some embodiments, the catalyst is introduced directly into the polymerization reactor. In some embodiments, the catalyst is pre-polymerized before being introduced into the first polymerization reactor. As used herein, the term "pre-polymerized" refers to a catalyst subjected to a polymerization step at a low conversion degree. As used herein, a catalyst is considered to be pre-polymerized when the amount the polymer produced is from about 0.1 up to about 1000 g per gram of solid catalyst component.

In some embodiments, the pre-polymerization is carried out with the alpha olefins selected from the same group of olefins previously described herein. In some embodiments, ethylene or mixtures thereof are pre-polymerized with one or more α-olefins in an amount up to 20% by mole. In some embodiments, the conversion of the pre-polymerized catalyst component is from about 0.2 g up to about 500 g per gram of solid catalyst component.

In some embodiments, the pre-polymerization step is carried out at temperatures from 0 to 80° C., alternatively from 5 to 50° C., in liquid or gas-phase. In some embodiments, the pre-polymerization step is performed in-line as a part of a continuous polymerization process or separately in a batch process. In some embodiments, the batch pre-polymerization of the catalyst with ethylene produces an amount of polymer ranging from 0.5 to 20 g per gram of catalyst component.

In some embodiments, the polymerization is carried out at temperature of from 20 to 120° C., alternatively from 40 to 80° C. In some embodiments, the polymerization is carried out in gas-phase and the operating pressure ranges between 0.5 and 10 MPa, alternatively between 1 and 5 MPa. In some embodiments and in bulk polymerization, the operating pressure ranges between 1 and 6 MPa, ranges between 1.5 and 4 MPa. In some embodiments, hydrogen or other compounds act as chain transfer agents and control the molecular weight of polymer.

The following examples are given in order to better illustrate the disclosure without limiting it.

EXAMPLES

The following examples are given to better illustrate the invention without limiting it.

Characterizations

Determination of Mg, Ti

The determination of Mg and Ti content in the solid catalyst component was carried out via inductively coupled plasma emission spectroscopy on "I.C.P Spectrometer ARL Accuris".

The sample was prepared by analytically weighing 0.1=0.3 grams of catalyst and 2 grams of lithium metaborate/tetraborate 1/1 mixture. After addition of some drops of KI solution, the sample was completely burned. The residue was collected with a 5% v/v $HNO_3$ solution and then analyzed via ICP at the following wavelengths: Magnesium, 279.08 nm; Titanium, 368.52 nm.

Determination of Bi

The determination of Bi content in the solid catalyst component was carried out via inductively coupled plasma emission spectroscopy on "I.C.P Spectrometer ARL Accuris". The sample was prepared by analytically weighing in a 200 milliliters volumetric flask 0.1-0.3 grams of catalyst. After slow addition of both about 20 milliliters of $H_2SO_4$ 95-98% and about 50 milliliters of distilled water, the sample underwent a digestion for 12 hours. Then the volumetric flask was diluted to the mark with deionized water. The resulting solution was directly analyzed via ICP at the following wavelength: bismuth, 223.06 nm.

Determination of Internal Donor Content

The content of internal donor in the solid catalytic compound was determined by gas chromatography. The solid component was dissolved in acetone, an internal reference was added, and a sample of the organic phase was analyzed in a gas chromatograph, thereby determining the amount of donor present at the starting catalyst compound.

Determination of X.I.

2.5 g of polymer and 250 ml of o-xylene were placed in a round-bottomed flask provided with a cooler and a reflux condenser and kept under nitrogen. The resulting mixture was heated to 135° C. and kept under stirring for about 60 minutes. The final solution was allowed to cool to 25° C. under continuous stirring, and the insoluble polymer was then filtered. The filtrate was then evaporated in a nitrogen flow at 140° C. to reach a constant weight. The content of the xylene-soluble fraction is expressed as a percentage of the original 2.5 grams and then, by difference, the X.I. %.

Molecular Weight Distribution (Mw/Mn)

Molecular Weight and Molecular Weight Distribution (MWD) were measured by Gel Permeation Chromatography (GPC) in 1,2,4-trichlorobenzene (TCB). Molecular weight parameters ($\overline{M_n}$, $\overline{M_w}$, $\overline{M_z}$) and molecular weight distributions for the samples were measured using a GPC-IR apparatus by PolymerChar, which was equipped with a column set of four PLgel Olexis mixed-bed (Polymer Laboratories) and an IR5 infrared detector (PolymerChar). The dimensions of the columns were 300×7.5 mm and their particle size 13 µm. The mobile phase flow rate was kept at 1.0 mL/min. The measurements were carried out at 150° C. Solution concentrations were 2.0 mg/mL (at 150° C.) and 0.3 g/L of 2,6-di-tertbutyl-p-cresol were added, thereby preventing degradation. For GPC calculation, a universal calibration curve was obtained using 12 polystyrene (PS) standard samples supplied by PolymerChar (peak molecular weights ranging from 266 to 1220000). A third order polynomial fit was used for interpolating the experimental data and obtain the relevant calibration curve. Data acquisition and processing was done by using Empower 3 (Waters).

The Mark-Houwink relationship was used to determine the molecular weight distribution and the relevant average molecular weights: the K values were $K_{PS}=1.21\times10^{-4}$ dL/g and $K_{PP}=1.90\times10^{-4}$ dL/g for polystyrene (PS) and polypropylene (PP) respectively, while the Mark-Houwink exponents $\alpha=0.706$ for PS and $\alpha=0.725$ for PP were used.

Melt Flow Rate (MIL)

The melt flow rate (MIL) of the polymer was determined according to ISO 1133 (230° C., 2.16 Kg).

$^{13}$C NMR of Propylene/Ethylene Copolymers $^{13}$C NMR spectra were acquired on a Bruker AV-600 spectrometer equipped with cryoprobe, operating at 160.91 MHz in the Fourier transform mode at 120° C. The peak of the S66 carbon (nomenclature according to "Monomer Sequence Distribution in Ethylene-Propylene Rubber Measured by 13C NMR. 3. Use of Reaction Probability Mode" C. J. Carman, R. A. Harrington and C. E. Wilkes, Macromolecules, 1977, 10, 536) was used as an internal reference at 29.9 ppm. The samples were dissolved in 1,1,2,2-tetrachloroethane-d2 at 120° C. with an 8% wt/v concentration. Each spectrum was acquired with a 90° pulse, 15 seconds of delay between pulses and CPD to remove $^1$H-$^{13}$C coupling. 512 transients were stored in 32K data points using a spectral window of 9000 Hz.

The assignments of the spectra, the evaluation of triad distribution and the composition were made according to Kakugo ("Carbon-13 NMR determination of monomer sequence distribution in ethylene-propylene copolymers prepared with δ-titanium trichloride-diethylaluminum chloride" M. Kakugo, Y. Naito, K. Mizunuma and T. Miyatake, Macromolecules, 1982, 15, 1150) using the following equations:

$$PPP = 100\, T_{\beta\beta}/S \quad PPE = 100\, T_{\beta\delta}/S \quad EPE = 100\, T_{\delta\delta}/S$$

$$PEP = 100\, S_{\beta\beta}/S \quad PEE = 100\, S_{\beta\delta}/S \quad EEE = \frac{100(0.25\, S_{\gamma\delta} + 0.5\, S_{\delta\delta})/S}$$

$$S = T_{\beta\beta} + T_{\beta\delta} + T_{\delta\delta} + S_{\beta\beta} + S_{\beta\delta} + 0.25\, S_{\gamma\delta} + 0.5\, S_{\delta\delta}$$

The molar percentage of ethylene content was evaluated using the following equation: E % mol=100*[PEP+PEE+EEE]

The weight percentage of ethylene content was evaluated using the following equation:

$$E\,\%\,\text{wt.} = \frac{100 * E\,\%\,\text{mol} * MW_E}{E\,\%\,\text{mol} * MW_E + P\,\%\,\text{mol} * MW_P}$$

where P % mol is the molar percentage of propylene content, while $MW_E$ and $MW_P$ are the molecular weights of ethylene and propylene, respectively.

General Procedure for the Preparation of Propylene/Ethylene Copolymers

A 4-liter steel autoclave equipped with a stirrer, a pressure gauge, a thermometer, a catalyst feeding system, monomer feeding lines and a thermostatic jacket, was purged with nitrogen flow at 70° C. for one hour. Then, at 30° C. under propylene flow (0.5 bar), a suspension containing 75 ml of anhydrous hexane, 0.76 g of $AlEt_3$, 3.3 mmol of diclopentyldimethoxysilane (D donor) and from 0.004 to 0.010 g of solid catalyst component, precontacted for 5 minutes, was charged. The autoclave was closed; subsequently hydrogen was added, as reported in Table 1. Then, under stirring, 1.2 kg of liquid propylene with ethylene (4 g) was fed during the raising of temperature from 30 up to 70° C. The temperature was raised to 70° C. in about 10-15 minutes and the polymerization was carried out at this temperature for two hours and ethylene was fed during the polymerization to keep the pressure constant. At the end of the polymerization, the non-reacted monomers were removed; the polymer was recovered and dried at 70° C. under vacuum for three hours. Then the polymer was weighed and characterized.

Example 1

A catalyst precursor of formula $Mg_3Ti(OEt)_8Cl_2$ was prepared as described in U.S. Pat. No. 5,077,357 (Illustrative Embodiment II).

Into a 500 ml round bottom flask, equipped with a mechanical stirrer, a cooler and a thermometer, 105 ml of $TiCl_4$ and 105 ml of chlorobenzene were introduced at room temperature under nitrogen atmosphere. After cooling to 0° C., while stirring, $BiCl_3$ in a powder form and in an amount such as to have a Mg/Bi molar ratio of 20, diisobutylphthalate (DIBP) in an amount such as to have a Mg/DIBP molar ratio of 10, and 10.3 g of a Mg based precursor were sequentially added into the flask. The temperature was raised to 100° C. and maintained for 1 hour. Thereafter, stirring was stopped, the solid product was allowed to settle, and the supernatant liquid was siphoned off at 100° C. After the supernatant was removed, additional fresh $TiCl_4$ and chlorobenzene was added at room temperature. The mixture was then heated at 120° C. and kept at this temperature for 60 minutes. Stirring was stopped again, the solid was allowed to settle and the supernatant liquid was siphoned off at 100° C. The solid was washed with anhydrous heptane four times in temperature gradient down to 90° C. and one time at 25° C. The resulting solid was then dried under vacuum and analyzed.

The catalyst component was used in the copolymerization of propylene with ethylene. The results are reported in Table 1.

Comparative Example C1

The procedure described in Example 1 was repeated with the exception that $BiCl_3$ was not used. The catalyst component was used in the copolymerization of propylene with ethylene. The results are reported in Table 1.

Comparative Example C2

DIBP based catalyst was prepared as described in Patent Cooperation Treaty Publication No. WO2017/042058 (examples 1-12), employing $BiCl_3$ dissolved in $TiCl_4$.

Comparative Example C3

DIBP based catalyst prepared as in C2 without using $BiCl_3$.

TABLE 1

| | Solid Catalyst Component | | | | | | |
|---|---|---|---|---|---|---|---|
| | Mg % wt. | Ti % wt. | Bi % wt. | DIBP % wt. | C2 % wt | Mileage Kg/g | XI % wt. | MIL g/10' |
| Ex. 1 | 20.9 | 1.6 | 1.4 | 6.8 | 4.1 | 184 | 94.6 | 5.4 |
| Ex. 2 | | | | | 3.8 | 170 | 95.2 | 5.1 |
| C1 | 19.3 | 3.0 | — | 11.1 | 3.8 | 108 | 93.2 | 7.7 |
| C2 | 18.7 | 2 | 2 | 13.0 | 3.4 | 130 | 95.6 | 4.9 |
| C3 | 18.7 | 2.7 | | 11.3 | 3.2 | 120 | 94.7 | 4.2 |

DIBP = diisobutyl phthalate

What is claimed is:

1. A solid catalyst component for the polymerization or copolymerization of olefins $CH_2=CHR$ wherein R is hydrogen or a hydrocarbon radical with 1-12 carbon atoms comprising titanium, magnesium, halogen, bismuth and an electron donor compound obtained by a process comprising the following steps:
   (a) dissolving a $Mg(OR)_2$ compound wherein R groups, equal to or different from each other, are $C_1$-$C_{15}$ hydrocarbon groups optionally containing a heteroatom selected from O, N and halogen, in an organic liquid medium, thereby forming a first liquid mixture;
   (b) contacting the first liquid mixture of step (a) with $TiCl_4$, thereby forming a second liquid mixture absent a solid phase, and
   (c) subjecting the second liquid mixture of step (b) to conditions, whereby solid catalyst particles are formed, wherein (i) a Bi compound and (ii) a bidentate electron donor compound are present in one or more of steps (a) to (c) and/or contacted with the solid catalyst particles obtained from step (c).

2. The catalyst component according to claim 1, wherein the Bi compound is selected from the group consisting of Bi halides, Bi carbonate, Bi carboxylates, Bi nitrate, Bi oxide, Bi sulphate and Bi sulfide.

3. The catalyst component according to claim 2, wherein the Bi compound is selected from the group consisting of Bi trichloride and a Bi decanoate.

4. The catalyst component according to claim 1, wherein the Bi compound is used in an amount ranging from 0.005 to 0.2 mole per mole of Mg.

5. The catalyst component according to claim 1, wherein the $Mg(OR)_2$ compound is a magnesium alkoxide wherein R is a $C_1$-$C_{15}$ alkyl group or has the structure of an ether group —ROR wherein R is a $C_1$-$C_{15}$ alkyl group as well.

6. The catalyst component according to claim 1, wherein in step (b), the second liquid mixture is prepared by reacting the Mg alkoxide with $TiCl_4$, a titanium alkoxide, a phenolic compound and an alkanol in an inert liquid diluent.

7. The catalyst component according to claim 6, wherein the alkoxy groups of the Mg alkoxide, alkanol and those of the Ti alkoxides, independently have up to 4 carbon atoms inclusive.

8. The catalyst component according to claim 6, wherein the reaction step (b) is carried out according to the following scheme carried out at a temperature ranging from 30 to 120° C.:

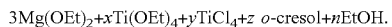

$$3Mg(OEt)_2 + xTi(OEt)_4 + yTiCl_4 + z\ o\text{-cresol} + n\text{EtOH}.$$

wherein y is more than 0.1 but less than about 0.8, (x+y) is more than 0.2 but less than 3, z is more than 0.05 but less than 3, and n is more than about 0.5 but less than about 9.

9. The catalyst component according to claim 8, wherein step (c) comprises raising the temperature, thereby removing the alkanol and causing solidification of particles.

10. The catalyst component according to claim 1, wherein the bidentate electron donor is selected from the group consisting of ethers, amines, silanes, carbamates, ketones, esters of aliphatic acids, alkyl and aryl esters of optionally substituted aromatic polycarboxylic acids, diol derivatives containing ester, carbamates, carbonates, amides groups or mixtures thereof.

11. The catalyst component according to claim 1, wherein in a further step (d), the bidentate electron donor and optionally, a tetravalent titanium halide, are contacted with the solidified particles obtained from step (c).

12. The catalyst component according to claim 1, wherein in step (b), the Mg alkoxide solution is mixed with $TiCl_4$ at a temperature of about −20° C. to about 30° C. and in the presence of a surfactant and in the successive step (c), precipitation of the solid catalyst components is obtained by slowly raising the temperature to at least 50° C.

13. The catalyst component according to claim 12, wherein the bidentate electron donor is added to the Mg alkoxide solution prepared in step (a).

14. The catalyst component according to claim 1, wherein the Mg alkoxide solution in a $C_6$-$C_{10}$ aromatic liquid reaction medium prepared in step (a), is first contacted with the electron donor or precursor thereof, thereby obtaining a further solution; in step (b), the solution obtained in step (a) is reacted with titanium tetrahalide at a temperature greater than 10° C. and less than 60° C., thereby producing an emulsion of a denser, $TiCl_4$/toluene-insoluble, oil dispersed phase having a Ti/Mg mol ratio 0.1 to 10 in an oil disperse phase having Ti/Mg mol ratio 10 to 100, in the presence of an emulsion stabilizer.

15. The catalyst component according to claim 14, wherein in step (c), solidification of the dispersed phase droplets by heating is carried out at a temperature of 70-150° C.

* * * * *

UNITED STATES PATENT AND TRADEMARK OFFICE
CERTIFICATE OF CORRECTION

PATENT NO. : 11,220,519 B2
APPLICATION NO. : 17/267601
DATED : January 11, 2022
INVENTOR(S) : Guidotti et al.

It is certified that error appears in the above-identified patent and that said Letters Patent is hereby corrected as shown below:

In the Specification

In Column 5, Line 12, delete "$R^{VI}$" and insert -- $R^{VII}$ --, therefor

In Column 5, Line 15, delete "$R$-$R^{VI}$" and insert -- $R$-$R^{VII}$ --, therefor In Column 12, Line 28, delete "0.1=0.3" and insert -- 0.1÷0.3 --, therefor In Column 13, Line 30, delete "S66" and insert -- $S_{\delta\delta}$ --, therefor In Column 13, Line 45, delete "6-titanium" and insert -- δ-titanium --, therefor In the Claims In Column 15, Claim 5, Line 48, after "group" delete "as well"

Signed and Sealed this
Twentieth Day of August, 2024

Katherine Kelly Vidal
*Director of the United States Patent and Trademark Office*